United States Patent
Iwamura

(10) Patent No.: US 6,742,559 B2
(45) Date of Patent: Jun. 1, 2004

(54) PNEUMATIC TIRE INCLUDING WING RUBBER

(75) Inventor: Wako Iwamura, Kobe (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 4 days.

(21) Appl. No.: 09/973,877

(22) Filed: Oct. 11, 2001

(65) Prior Publication Data

US 2002/0062891 A1 May 30, 2002

(30) Foreign Application Priority Data

Oct. 11, 2000 (JP) ........................................ 2000-311085

(51) Int. Cl.⁷ .............................. B60C 1/00; B60C 9/02; B60C 9/14; B60C 11/00; B60C 11/01
(52) U.S. Cl. .............................. 152/209.5; 152/209.16; 152/525; 152/543; 152/554
(58) Field of Search .................. 152/209.5, 209.16, 152/523, 525, 543, 554, 532

(56) References Cited

U.S. PATENT DOCUMENTS

| | | | |
|---|---|---|---|
| 3,598,165 A | | 8/1971 | Hanus |
| 4,006,766 A | * | 2/1977 | Takayanagi et al. |
| 6,550,509 B1 | * | 4/2003 | Nguyen et al. |

FOREIGN PATENT DOCUMENTS

| | | |
|---|---|---|
| EP | 0 755 808 A | 1/1997 |
| EP | 0 962 340 A | 12/1999 |
| JP | 60-47703 * | 3/1985 |

OTHER PUBLICATIONS

Patent Abstracts of Japan, vol. 16, No. 041 (M-1206), Jan. 31, 1992. Japan 3-246103.

* cited by examiner

Primary Examiner—Steven D. Maki
(74) Attorney, Agent, or Firm—Birch, Stewart, Kolasch & Birch, LLP

(57) ABSTRACT

A pneumatic tire which includes a carcass having a carcass main extending from a bead core in one of the bead portions to a bead core in the other bead portion, and a pair of carcass turnups extending axially outside the carcass main; a tread rubber disposed in the tread portion; a sidewall rubber disposed in each of the sidewall portions; and a wing rubber interposed between the tread rubber and sidewall rubber. Each of the carcass turnups extends from axially outside of the bead core to a point in the sidewall portion. While extending from axially outside of the bead core to the point in the sidewall portion, the carcass turnup approaches the carcass main and adjoins the carcass main from a first radial height to a second radial height and then separates from the carcass main from said second radial height so as to form a separating part. The wing rubber has a JIS type-A durometer hardness of from 45 to 60 degrees, and a radially inner part of the wing rubber is inserted between said separating part and the carcass main.

7 Claims, 4 Drawing Sheets

PNEUMATIC TIRE INCLUDING WING RUBBER

BACKGROUND OF THE INVENTION

The present invention relates to a pneumatic tire, more particularly to a sidewall structure being capable of improving durability.

In recent years, low profile tires whose aspect ratio is less than 60% are widely used. Especially, in the very low profile tires used in high-performance sport cars, passenger cars, etc., the aspect ratio reaches to 35% or less.

In such a low profile tire, as shown in FIG. 4, as the tire section height is low, the height of the turnup (a2) of the carcass (a) becomes relatively high, and the edge (e) of the carcass turnup (a2) approaches the tire shoulder region (d) or upper sidewall portion (c) which are subjected to a large bending deformation during running. As a result, the possibility of carcass ply edge separation due to stress concentration on the edge (e) increases.

SUMMARY OF THE INVENTION

It is therefore, an object of the present invention to provide a pneumatic tire in which the carcass ply edge separation is effectively prevented to improve the durability.

According to the present invention, a pneumatic tire is provided which comprises a tread portion, a pair of sidewall portions, a pair of bead portions each with a bead core therein, a carcass comprising a carcass main extending from the bead core in one of the bead portions to the bead core in the other bead portion, and a pair of carcass turnups axially outside the carcass main, a tread rubber disposed in the tread portion, a sidewall rubber disposed in each of the sidewall portions, and a wing rubber interposed between the tread rubber and sidewall rubber, wherein each carcass turnup extends from the axially outside of the bead core to a point in the sidewall portion, while extending from the axially outside of the bead core to the point in the sidewall portion, the carcass turnup approaches the carcass main and adjoins the carcass main from a first radial height to a second radial height and then separates from the carcass main from the second radial height so as to form a separating part, the wing rubber has a JIS type-A durometer hardness of from 45 to 60 degrees, and a radially inner part of the wing rubber is inserted between the separating part and the carcass main.

BRIEF DESCRIPTION OF THE DRAWINGS

An embodiment of the present invention will now be described in detail in conjunction with the following drawings, wherein.

DETAILED DESCRIPTION OF THE INVENTION

Figure 1:
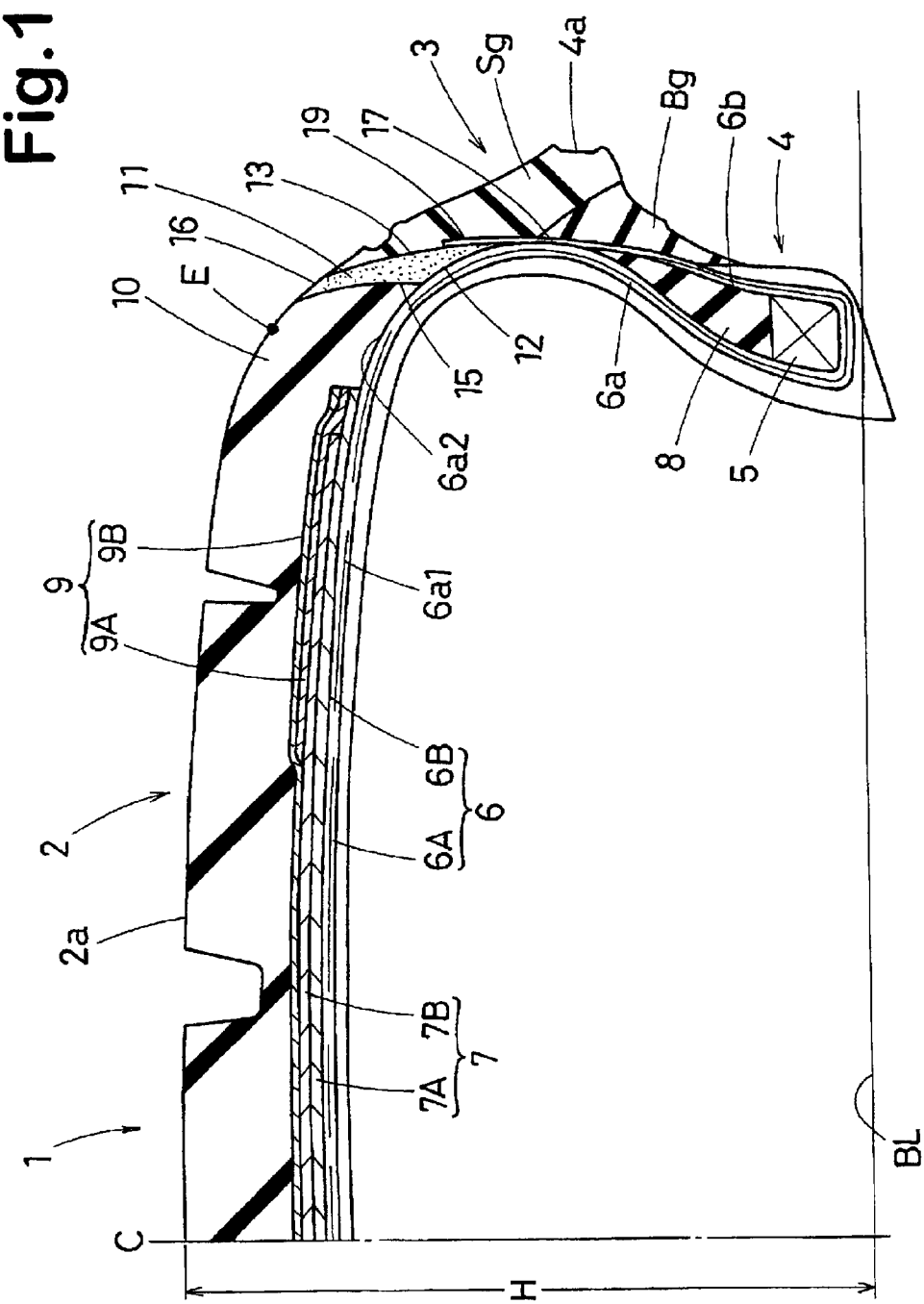
FIG. 1 is a cross sectional view of a pneumatic tire according to the present invention.

In the drawings, a pneumatic tire 1 according to the present invention includes a tread portion 2, a pair of sidewall portions 3, a pair of bead portions 4 each with a bead core therein, a carcass 6 extending between the bead portions 4, and a tread reinforcing belt 7, 9.

Figure 2:
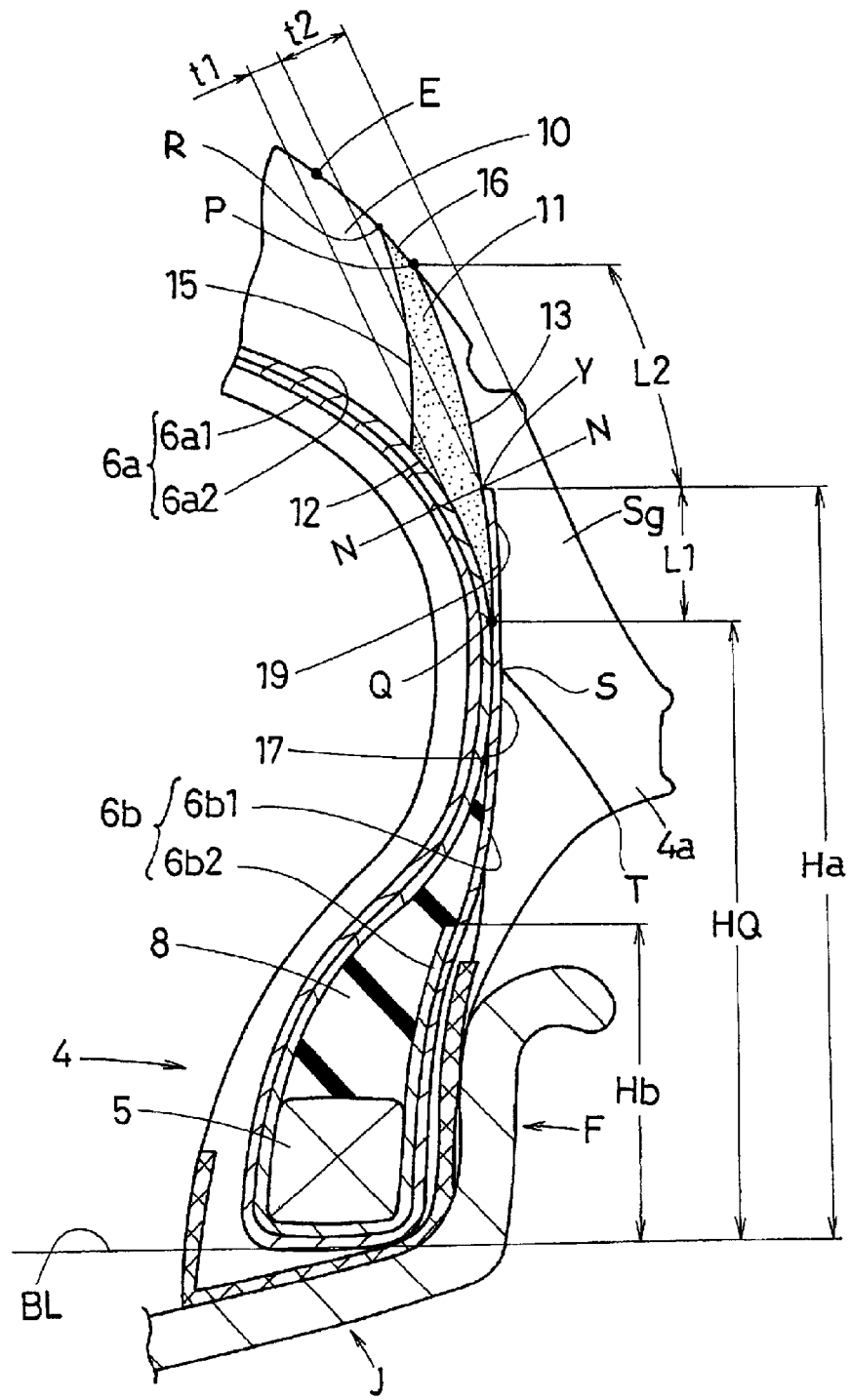
FIG. 2 is an enlarged cross sectional view of the sidewall portion thereof.

In the embodiment shown in FIG. 1 and FIG. 2, the tire 1 is a radial tire for passenger cars whose aspect ratio is less than 50%, (in this example 35%). Its normally inflated unloaded state is shown.

The normally inflated unloaded state means that the tire is mounted on a standard wheel rim J and inflated to a standard pressure but loaded with no tire load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure. The undermentioned standard loaded state means that the tire is mounted on the standard wheel rim J and inflated to the standard pressure then loaded with a standard load. The standard load is the "maximum load capacity" in JATMA, the "Load Capacity" in ETRTO, the maximum value given in the above-mentioned table in TRA or the like. Here, the undermentioned various radial heights are measured under the normally inflated unloaded state. The tread edges E is defined as the axial outermost edges of the ground contacting region under the standard loaded state.

The carcass 6 is composed of at least one ply of cords arranged radially at an angle of from 90 to 75 degrees with respect to the tire equator C and extending between the bead portions 4 through the tread portion 2 and sidewall portions 3 and turned up around the bead core 5 in each of the bead portions 4 from the inside to the outside of the tire so as to form a pair of turned up portions 6b and a main portion 6a therebetween.

For the carcass cords, preferably, organic fiber cords, e.g. polyester, nylon, rayon and the like are used. But steel cords may be used too according to the required performance.

In this example, the carcass 6 is composed of two plies of organic fiber cords, namely, an inner carcass ply 6A which has a main portion 6a1 and a pair of turned up portions 6b1, and an outer carcass ply 6B which has a main portion 6a2 and a pair of turned up portions 6b2. In the outer carcass ply 6B, the height Hb of the radially outer end of the turned up portion 6b2 is set in a range of less than 50%, in this example 1 to 25%, of the tire section height H, each measured from the bead base line BL. In the inner carcass ply 6A, the height Ha of the radially outer end of the turned up portion 6b1 is set in a range of from 35 to 80%, preferably 40 to 65% of the tire section height H, each from the bead base line BL.

Thus, it can be said that the carcass 6 is composed of the carcass main 6a extending from bead core to bead core and a pair of carcass turnups 6b extending from the axially outside of the bead core toward the upper sidewall portion. In this example, the carcass main 6a is made up of the main portions 6a1 and 6a2, and each carcass turnup 6b is made up of the turned up portions 6b1 and 6b2.

Aside from the above-mentioned combination of the carcass ply 6A and the carcass ply 6B, another combinations may be also possible, for example, a combination of the carcass ply 6A with high turned up portions 6b1 and another carcass ply having no turned up portion, a combination of the carcass ply 6A with high turned up portions 6b1 and a carcass ply with similar high turned up portions, and the like. Further, a solo use of the carcass ply 6A with high turned up portions 6b1 is also possible.

The bead portions 4 are each provided between the carcass main 6a and carcass turnup 6b with a bead apex rubber 8 made of a hard rubber compound. The bead apex rubber 8 extends radially outwardly from the radially outer face of the bead core 5, while tapering towards its radially outer end. The axially inner surface thereof touches the carcass main 6a, and the axially outer surface touches the carcass turnup 6b. The bead apex rubber 8 is completely wrapped in the carcass together with the bead core 5.

In other words, the carcass turnup 6b extends radially outwardly beyond the radially outer end of the bead apex rubber so as to touch the carcass main 6a in a predetermined range between two radial heights, forming a touching part 17. Then, the carcass turnup 6b again separates from the carcass main 6a. This separating part 19 continues to its radially outer end Y. Between those two radial heights, the maximum section width of the carcass main 6a under the above-mentioned normally inflated unloaded state lies.

The above-mentioned tread reinforcing belt comprises a breaker 7 and optionally a band 9.

The breaker 7 comprises two cross plies 7A and 7B of high modulus cords laid parallel with each other at an angle of from about 10 degrees to about 40 degrees with respect to the tire equator.

The band 9 is made of organic fiber cords whose cord angles with respect to the tire equator are substantially zero, namely, at most about 5 degrees.

In this example, the breaker 7 is composed of two cross plies 7A and 7B of parallel steel cords, and the band 9 is composed of a pair of axially spaced edge plies 9A covering the breaker edges, and a full-width ply 9B covering the substantially entire width of the breaker 7.

The tread portion 2 is provided radially outside the belt with a tread rubber 10. The tread rubber 10 is defined as existing between the radially outside of the belt (band 9) and the tread face 2a. As to the axially extent, on the other hand, the tread rubber 10 is defined as extending between the above-mentioned tread edges E at least. Usually, it extends slightly beyond the tread edges E. The tread rubber 10 may be made of a single rubber compound, but it is also possible that the tread rubber 10 is made of two or more different rubber compounds which form a layered structure, including the radially outermost cap rubber layer and the radially innermost base rubber layer.

On each side of the tread rubber 10, there is disposed a wing rubber 11 bridging the tread rubber 10 and the undermentioned upper sidewall rubber Sg.

The wing rubber 11 is made of a rubber compound softer than the tread rubber and has a JIS type-A durometer hardness of from 45 to 60 degrees, preferably 50 to 58 degrees, more preferably 52 to 56 degrees. The wing rubber 11 is defined as having an axially inner face 15 touching the side face of the tread rubber 10, a radially outer face 16 extending axially outwards and radially inwards from the intersecting point R between the axially inner face 15 and the tire outer surface to a point P while defining a part of the tire outer surface, an axially outer surface 13 extending radially inwards from the point P to a point Q on the carcass main 6a (in this example, 6a2), and a radially inner face 12 extending from the point Q to the intersecting point between the axially inner face 15 and the carcass main 6a while abutting the carcass main 6a.

The radially outer face 16 is formed axially outside the tread edge E and the distance therebetween is preferably set in a range of from 2 to 10 mm, whereby partial wear of the relative soft wing rubber due to its ground contact can be prevented.

The above-mentioned point Q corresponds to the separating point of the above-mentioned separating part 19, and the separating part 19 extends along the axially outer surface 13. In other words, a tapered radially inner end portion of the wing rubber 11 is inserted between the carcass main 6a and carcass turnup 6b up to the separating point Q. The separating part 19 terminates in the middle of the axially outer surface 13. In a range from the radially outer end Y thereof to the point P, the wing rubber 11 comes into contact with the upper sidewall rubber Sg.

The upper sidewall rubber Sg is disposed in each sidewall portion 3 and made of a rubber compound different from the wing rubber 11.

In this example, as shown in FIG. 2, the upper sidewall rubber Sg forms an axially outwardly protruding rim protector 4a overhanging the flange F of the wheel rim J. As the upper sidewall rubber Sg is relatively thick, it is necessary to provide the sidewall portion with an appropriate flexibility by decreasing the hardness. Therefore, the JIS type-A durometer hardness of the upper sidewall rubber Sg is set in a range of from 45 to 65 degrees, preferably 50 to 60 degrees.

On the radially inside of the upper sidewall rubber Sg, a lower sidewall rubber Bg harder than the upper sidewall rubber Sg is disposed in order to improve the bending rigidity of the sidewall portion 3. The JIS type-A durometer hardness of the lower sidewall rubber Bg is set in a range of from 65 to 95 degrees, preferably 70 to 85 degrees. The upper sidewall rubber Sg comes into contact with the wing rubber 11 in a range between the points P and Y, and comes into contact with the carcass turnup 6b in a range between the point Y and a point S on the axially outer face of the carcass turnup 6b. In this example, the point S is positioned in the above-mentioned touching part 17. The boundary between the upper sidewall rubber Sg and lower sidewall rubber Bg extends axially outwards and radially inwards from the point S to a point T on the underside of the rim protector 4a. The lower sidewall rubber Bg has a radially outer face touching the upper sidewall rubber Sg defining the above-mentioned boundary, an axially inner face touching the carcass turnup 6b, and an axially outer face exposed to the outside of the tire and extending at least a region which has a possibility to come into contact with the rim flange F under a deflated condition or heavy load conditions. As a result, the lower sidewall rubber Bg has a generally triangular cross sectional shape.

The above-mentioned point T is the radially outermost point of the lower sidewall rubber Bg. The thickness of the lower sidewall rubber Bg measured in the tire axial direction decreases continuously from the lower sidewall rubber Bg to its radially outer end (point S) and radially inner end.

The thickness of the wing rubber 11 measured in the tire axial direction increases continuously from the separating point Q to the radially outer end Y of the separating part 19. The thickness of the wing rubber 11 and the thickness of the upper sidewall rubber Sg measured in the tire axial direction decrease gradually from the radially outer end Y to the point P.

The thickness t1 of the wing rubber 11 measured along a straight line N—N drawn normally to the tire outer surface passing the outer end Y of the separating part 19 is set in a range of from 1 to 10 mm, preferably 2 to 8 mm.

The rubber thickness t2 measured along the above-mentioned straight line N—N from the outer end Y of the separating part 19 to the tire outer surface is set in a range of from 1 to 15 mm, preferably 2 to 10 mm.

The length L1 of the separating part 19 measured along the axially outer surface 13 is set in a range of from 1 to 15 mm, preferably 3 to 10 mm, more preferably 5 to 8 mm.

The length L2 measured along the axially outer surface 13 from the radially outer end Y to the point P is preferably set in a range of from 3 to 30 mm, more preferably 5 to 20 mm.

The radial height HQ of the point Q from the bead base line BL is set in the range of from 35 to 75%, preferably 40 to 60% of the tire section height H.

COMPARISON TESTS

Test tire of size 225/35ZR19 (rim size: 8JX19) having the structure shown in FIG. 1, were made and tested for durability and steering stability as follows.

1) Durability test

Using a 0.85 meter radius test drum, the test tire inflated to 220 kPa was run at a speed of 80 km/hr under a load of 5.5 kN and the running distance to breakage was measured. When the running distance reached to 30,000 km, the test was stopped.

2) Steering stability test

During running a 2500 cc passenger car provided on all the four wheels with test tires on a dry asphalt road, the test driver evaluated steering stability, based on response, stability, grip and the like. The results are indicated by an index based on Ref.1 being 100, wherein the larger the index number, the better the performance.

The test results are shown in Table 1.

TABLE 1

Figure 3:
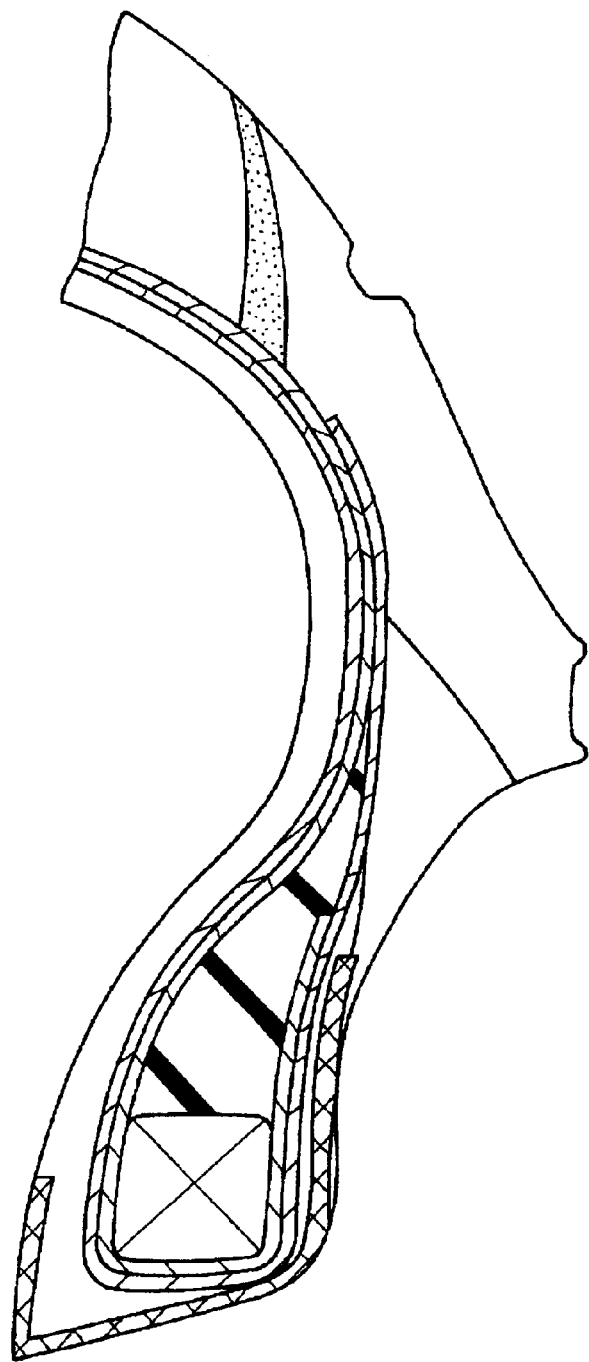
FIG. 3 is a cross sectional view of a reference tire used in comparison; tests
Figure 4:
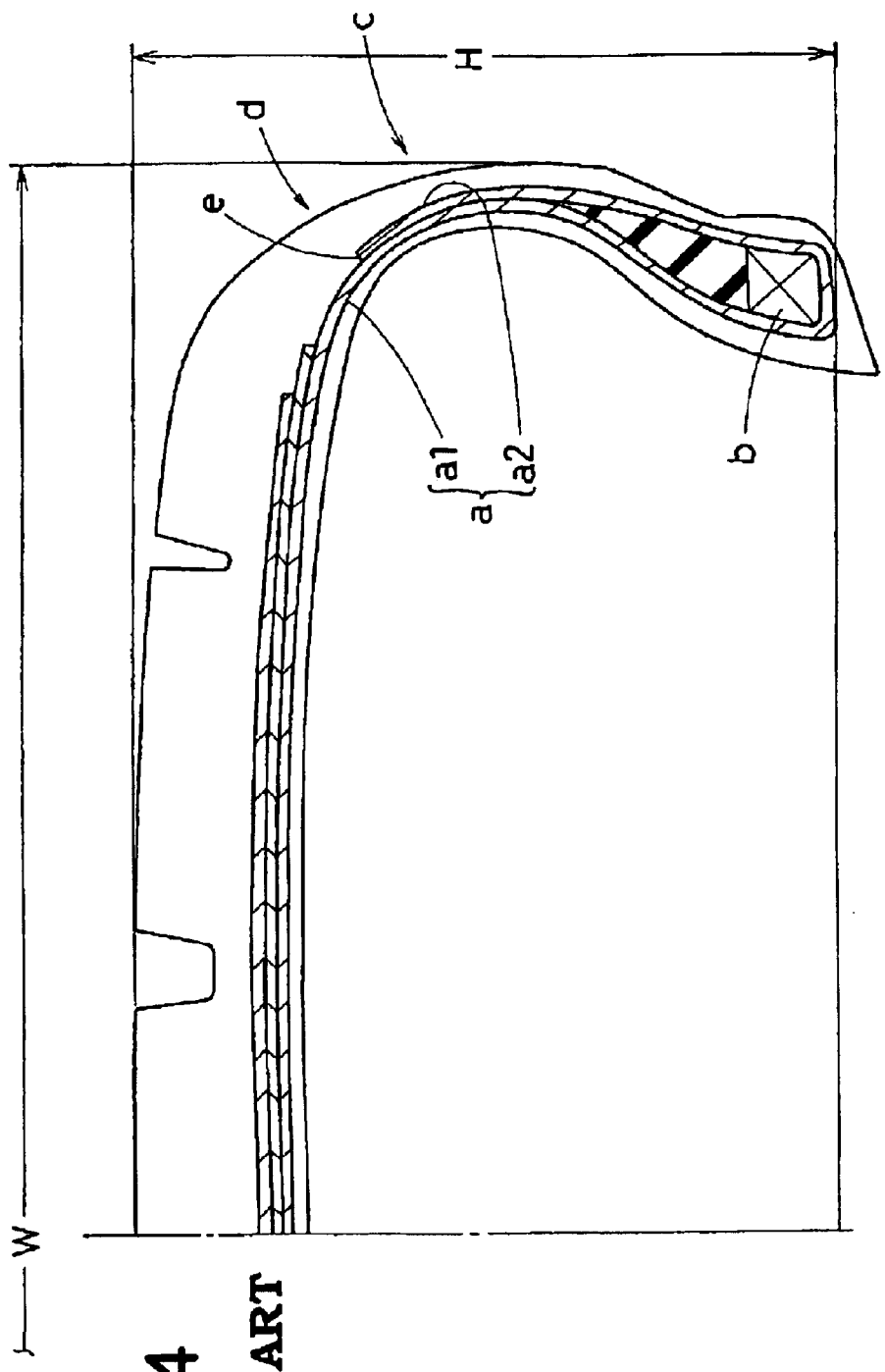
FIG. 4 is a cross sectional view for explaining a problem of a low profile tire.

| Tire | Ref. 1 | Ref. 2 | Ex. 1 | Ex. 2 | Ex. 3 | Ex. 4 | Ex. 5 |
|---|---|---|---|---|---|---|---|
| Carcass turnup | FIG. 3 | *1 | FIG. 2 | FIG. 2 | FIG. 2 | FIG. 2 | FIG. 2 |
| Wing rubber | FIG. 3 | FIG. 3 | FIG. 2 | FIG. 2 | FIG. 2 | FIG. 2 | FIG. 2 |
| Hardness (deg.) | 53 | 53 | 53 | 53 | 53 | 46 | 58 |
| t1 (mm) | — | — | 2 | 4 | 6 | 4 | 4 |
| t2 (mm) | — | — | 8 | 6 | 4 | 6 | 6 |
| L1 (mm) | — | — | 5 | 10 | 18 | 10 | 10 |
| L2 (mm) | 20 | 30 | 20 | 15 | 7 | 15 | 15 |
| H (mm) | 79 | 79 | 79 | 79 | 79 | 79 | 79 |
| Ha (mm) | 60 | 60 | 60 | 60 | 60 | 60 | 60 |
| Hb (mm) | 20 | | 20 | 20 | 20 | 20 | 20 |
| Steering stability | 100 | 95 | 105 | 110 | 115 | 100 | 115 |
| Durability | 18000 km edge separation | 15000 km edge separation | 30000 km no trouble | 30000 km no trouble | 30000 km no trouble | 30000 km no trouble | 30000 km no trouble |

*1 Similar to FIG. 3 but the outer carcass ply corresponding to the outer carcass ply 6B was removed.

From the test results, it was confirmed that the tires according to the invention can be improved in both the durability and steering stability.

What is claimed is:

1. A pneumatic tire comprising a tread portion, a pair of sidewall portions, a pair of bead portions each with a bead core therein, a carcass comprising a carcass main extending from the bead core in one of the bead portions to the bead core in the other bead portion, and a pair of carcass turnups axially outside the carcass main, a tread rubber disposed in the tread portion, a sidewall rubber disposed in each of the sidewall portions, and a wing rubber interposed between the tread rubber and sidewall rubber, each said carcass turnup extends from the axially outside of the bead core to a point in the sidewall portion, while extending from the axially outside of the bead core to the point in the sidewall portion, said carcass turnup approaches the carcass main and adjoins the carcass main from a first radial height to a second radial height and then separates from the carcass main from said second radial height so as to form a separating part, said wing rubber has a JIS type-A durometer hardness of from 45 to 60 degrees, and a radially inner part of the wing rubber is inserted between said separating part and the carcass main, the wine rubber extends from the outer surface of the tire towards the carcass main, and a boundary of the wing rubber and the sidewall rubber extends from the outer surface of the tire to the radially outer end of said separating part, and the length of the boundary is in a range of from 10 to 50 mm.

2. The pneumatic tire according to claim 1, wherein the length of the separating part is in a range of from 1 to 15 mm.

3. The pneumatic tire according to claim 1, wherein a boundary of the wing rubber and the tread rubber extends from the outer surface of the tire to the carcass main.

4. The pneumatic tire according to claim 3, wherein on the outer surface of the tire, the boundary of the wing rubber and the tread rubber is axially outside a tread edge.

5. The pneumatic tire according to claim 1, wherein a maximum section width of the carcass main lies between said first radial height and said second radial height.

6. The pneumatic tire according to claim 1, wherein said sidewall rubber is spliced with a lower sidewall rubber disposed on the axially outside of the carcass turnup, the sidewall rubber has a JIS type-A durometer hardness in a range of from 45 to 65 degrees, and the lower sidewall rubber has a JIS type-A durometer hardness in a range of more than 65 to 95 degrees, said sidewall rubber forms a rim protector which protrudes axially outwardly so as to overhang a flange of a wheel rim on which the tire is mounted, the boundary between the sidewall rubber and lower sidewall rubber extends from a point on the carcass turnup to a point on the outer surface of the tire, while inclining radially inwards, and said point on the carcass turnup is axially inside the rim protector, and said point on the tire outer surface is underside of the rim protector.

7. A pneumatic tire comprising a tread portion, a pair of sidewall portions, a pair of bead portions each with a bead core therein, a carcass comprising a carcass main extending from the bead core in one of the bead portions to the bead core in the other bead portion, and a pair of carcass turnups axially outside the carcass main, a tread rubber disposed in the tread portion, a sidewall rubber disposed in each of the sidewall portions, and a wing rubber interposed between the tread rubber and sidewall rubber, each said carcass turnup extends from the axially outside of the bead core to a point in the sidewall portion, while extending from the axially outside of the bead core to the point in the sidewall portion, said carcass turnup approaches the carcass main and adjoins the carcass main from a first radial height to a second radial height and then separates from the carcass main from said second radial height so as to form a separating part, said wing rubber has a JIS type-A durometer hardness of from 45 to 60 degrees, and a radially inner part of the wing rubber is inserted between said separating part and the carcass main, wherein a boundary of the wing rubber and the tread rubber extends from the outer surface of the tire to the carcass main.

* * * * *